(12) United States Patent
Coronato et al.

(10) Patent No.: US 8,042,394 B2
(45) Date of Patent: Oct. 25, 2011

(54) HIGH SENSITIVITY MICROELECTROMECHANICAL SENSOR WITH ROTARY DRIVING MOTION

(75) Inventors: Luca Coronato, Corsico (IT); Alessandro Balzelli Ludovico, Cornaredo (IT); Sarah Zerbini, Cornaredo (IT)

(73) Assignee: STMicroelectronics S.r.l., Agrate Brianza (IT)

(*) Notice: Subject to any disclaimer, the term of this patent is extended or adjusted under 35 U.S.C. 154(b) by 631 days.

(21) Appl. No.: 12/208,977

(22) Filed: Sep. 11, 2008

(65) Prior Publication Data

US 2009/0100930 A1    Apr. 23, 2009

Related U.S. Application Data

(60) Provisional application No. 60/971,496, filed on Sep. 11, 2007.

(51) Int. Cl.
*G01C 19/56* (2006.01)

(52) U.S. Cl. .................................. 73/504.04; 73/504.12

(58) Field of Classification Search .............. 73/504.04, 73/504.12, 514.32
See application file for complete search history.

(56) References Cited

U.S. PATENT DOCUMENTS

| | | | |
|---|---|---|---|
| 5,889,207 A | 3/1999 | Lutz | |
| 6,062,082 A * | 5/2000 | Guenther et al. | 73/514.16 |
| 6,189,381 B1 | 2/2001 | Huang et al. | |
| 6,244,111 B1 | 6/2001 | Funk | |
| 6,250,157 B1 | 6/2001 | Touge | |
| 6,349,597 B1 | 2/2002 | Folkmer et al. | |
| 6,374,672 B1 | 4/2002 | Abbink et al. | |
| 6,513,380 B2 | 2/2003 | Reeds, III et al. | |
| 6,626,039 B1 | 9/2003 | Adams et al. | |
| 6,715,352 B2 | 4/2004 | Tracy | |
| 6,837,107 B2 | 1/2005 | Geen | |
| 6,894,576 B2 | 5/2005 | Giousouf et al. | |
| 6,918,298 B2 | 7/2005 | Park | |
| 6,952,965 B2 | 10/2005 | Kang et al. | |
| 7,100,446 B1 | 9/2006 | Acar et al. | |
| 7,258,012 B2 | 8/2007 | Xie | |
| 7,677,099 B2 | 3/2010 | Nasiri et al. | |
| 7,694,563 B2 | 4/2010 | Durante et al. | |
| 2002/0189354 A1 | 12/2002 | Durante et al. | |
| 2007/0214883 A1 | 9/2007 | Durante et al. | |
| 2009/0064780 A1 | 3/2009 | Coronato et al. | |
| 2009/0100930 A1 | 4/2009 | Coronato et al. | |
| 2010/0126269 A1 | 5/2010 | Coronato et al. | |
| 2010/0126272 A1 | 5/2010 | Coronato et al. | |
| 2010/0154541 A1 | 6/2010 | Cazzaniga et al. | |
| 2010/0281977 A1 | 11/2010 | Coronato et al. | |

* cited by examiner

*Primary Examiner* — John Chapman, Jr.
(74) *Attorney, Agent, or Firm* — Lisa K. Jorgenson; Robert Iannucci; Seed IP Law Group PLLC (57) ABSTRACT

A driving mass of an integrated microelectromechanical structure is moved with a rotary motion about an axis of rotation, and a sensing mass is connected to the driving mass via elastic supporting elements so as to perform a detection movement in the presence of an external stress. The driving mass is anchored to an anchorage arranged along the axis of rotation by elastic anchorage elements. An opening is provided within the driving mass and the sensing mass is arranged within the opening. The elastic supporting and anchorage elements render the sensing mass fixed to the driving mass in the rotary motion, and substantially decoupled from the driving mass in the detection movement. The detection movement is a rotation about an axis lying in a plane. The sensing mass has, in plan view, a non-rectangular shape; in particular, the sensing mass has a radial geometry and, in plan view, the overall shape of a radial annulus sector.

23 Claims, 3 Drawing Sheets

HIGH SENSITIVITY MICROELECTROMECHANICAL SENSOR WITH ROTARY DRIVING MOTION

BACKGROUND

1. Technical Field

The present invention relates to a high sensitivity microelectromechanical sensor having a rotary driving motion. In particular, in the following description reference will be made to a gyroscope (whether uniaxial or biaxial), which can possibly operate as an accelerometer (whether uniaxial or biaxial).

2. Description of the Related Art

As is known, microprocessing techniques enable formation of microelectromechanical structures or systems (the so-called MEMS) within layers of semiconductor material, which have been deposited (for example, in the case of a layer of polycrystalline silicon) or grown (for example, in the case of an epitaxial layer) on top of sacrificial layers, which are removed by chemical etching. Inertial sensors, accelerometers and gyroscopes obtained with this technology are encountering an increasing success, for example in the automotive field, in inertial navigation, or in the sector of portable devices.

In particular, integrated semiconductor gyroscopes are known, which are made with MEMS technology. Gyroscopes operate according to the theorem of relative accelerations, exploiting Coriolis acceleration. When an angular velocity is imparted on a movable mass that is moving with a linear velocity, the movable mass "feels" an apparent force, referred to as Coriolis force, which causes a displacement thereof in a direction perpendicular to the direction of the linear velocity and to the axis of rotation. The movable mass is supported via springs that enable a displacement in the direction of the apparent force. According to Hooke's law, the displacement is proportional to the apparent force, and consequently, based on the displacement of the movable mass, it is possible to detect the Coriolis force and the angular velocity that has generated it. The displacement of the movable mass can, for example, be detected capacitively, by measuring, in resonance conditions, the capacitance variations caused by the movement of movable electrodes, integrally fixed to the movable mass and operatively coupled to fixed electrodes.

US2007/214883, assigned to STMicroelectronics Srl, discloses a microelectromechanical integrated sensor with a rotary driving motion, which is sensitive to pitch and roll angular velocities.

This microelectromechanical sensor includes a single driving mass, anchored to a support at a single central point and driven with rotary motion about an axis, which passes through the central point and is orthogonal to the plane of the driving mass. The rotation of the driving mass enables two mutually orthogonal components of driving velocity in the plane of the mass. At least one through-opening is provided inside the driving mass, in which a sensing mass is arranged; the sensing mass is enclosed within the driving mass, suspended with respect to the substrate, and connected to the driving mass via flexible elements. The sensing mass is fixed to the driving mass during its rotary motion, and has a further degree of freedom of movement as a function of an external stress, in particular a Coriolis force acting on the sensor. The flexible elements, according to their particular construction, allow the sensing mass to perform a rotary movement of detection about an axis lying in the plane of the sensor in response to a Coriolis acceleration acting in a direction perpendicular to the plane, in a way substantially decoupled from the driving mass. The microelectromechanical structure, in addition to being compact (in so far as it envisages just one driving mass that encloses in its overall dimensions one or more sensing masses), enables with minor structural modifications, a uniaxial, biaxial or triaxial gyroscope (and/or an accelerometer, according to the electrical connections implemented) to be obtained, at the same time ensuring an excellent decoupling of the driving mass from the sensing mass during the movement of detection.

Figure 1:
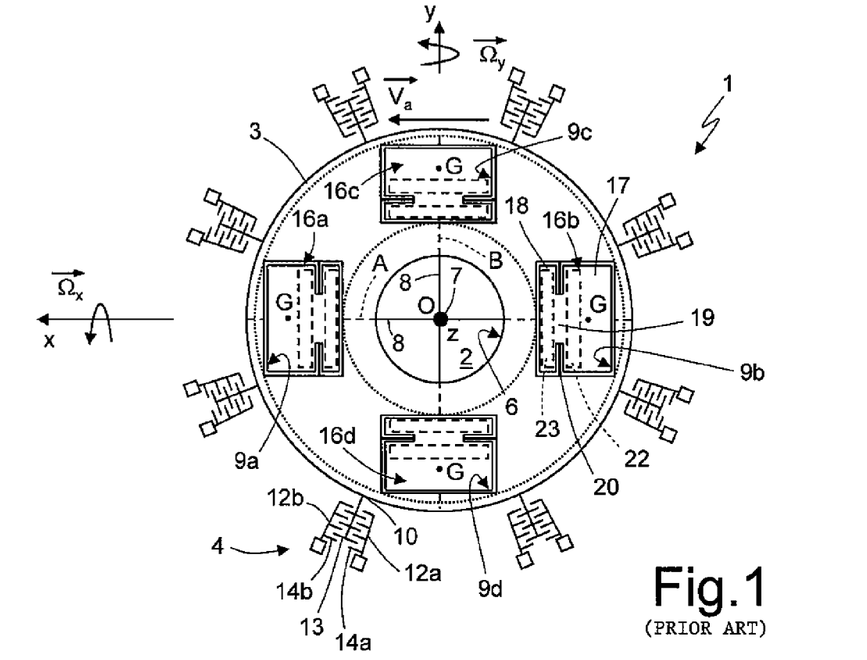
FIG. 1 is a schematic top plan view of a microelectromechanical structure of a known type.

In detail, and as shown in FIG. 1, that relates to a biaxial sensor, the microelectromechanical sensor, denoted with 1, comprises a driving structure formed by a driving mass 3 and by a driving assembly 4. The driving mass 3 has a circular geometry with radial symmetry, with a substantially planar configuration having a main extension in a plane defined by a first axis x and by a second axis y (referred to in what follows as "plane of the sensor xy"), and negligible dimension, with respect to the main extension, in a direction parallel to a third axis (referred to in what follows as "orthogonal axis z"), forming with the first and second axes x, y a set of three orthogonal axes fixed with respect to the sensor structure. In particular, the driving mass 3 has in the plane of the sensor xy substantially the shape of an annulus, and defines at the center a circular empty space 6, the center O of which coincides with the centroid and the center of symmetry of the driving mass 3. The driving mass 3 is anchored to a substrate 2 (e.g. of semiconductor material) by means of an anchorage 7 arranged at the center O, to which it is connected through elastic anchorage elements 8. For example, the elastic anchorage elements 8 depart in a crosswise configuration from the center O along a first axis of symmetry A and a second axis of symmetry B of the driving mass 3, the axes of symmetry being parallel, respectively, to the first axis x and to the second axis y. The elastic anchorage elements 8 enable a rotary driving movement of the driving mass 3 about a drive axis passing through the center O, parallel to the orthogonal axis z and perpendicular to the plane of the sensor xy.

The driving mass 3 has a first pair of through-openings 9a, 9b with a substantially rectangular shape elongated in a direction parallel to the second axis y, aligned in a diametric direction along the first axis of symmetry A, and set on opposite sides with respect to the empty space 6; and a second pair of through-openings 9c, 9d, which are aligned along the second axis of symmetry B, have a substantially rectangular shape elongated in a direction parallel to the first axis x, and are arranged on opposite sides with respect to the empty space 6. In particular, the direction of alignment of the through-openings of each pair corresponds to a direction of detection of the microelectromechanical sensor 1 (in the case represented in the figure, coinciding with the first and second axes x, y).

The driving assembly 4 comprises a plurality of driven arms 10 (for example, eight in number), extending externally from the driving mass 3 in a radial direction and spaced apart at a same angular distance, and a plurality of first and second driving arms 12a, 12b, extending parallel to, and on opposite sides of, respective driven arms 10 and anchored to the substrate 2 through respective anchorages. Each driven arm 10 carries a plurality of first electrodes 13, extending in a direction perpendicular to, and on either side of, the same driven arm. Furthermore, each of the first and second driving arms 12a, 12b carries respective second electrodes 14a, 14b, extending towards the respective driven arm 10 and comb-fingered to the corresponding first electrodes 13. The first driving arms 12a are all arranged on the same side of the respective driven arms 10 and are all biased at a first voltage. Likewise, the second driving arms 12b are all arranged on the opposite side of the respective driven arms 10, and are all biased at a second voltage. In a per se known manner which is not described in detail, a driving circuit is connected to the second electrodes 14a, 14b so as to apply the first and second voltages and determine, by means of mutual and alternating attraction of the electrodes, an oscillatory rotary motion of the driving mass 3 about the drive axis, at a given oscillation frequency.

The microelectromechanical sensor 1 further comprises a first pair of acceleration sensors with axis parallel to the orthogonal axis z, and in particular a first pair of sensing masses 16a, 16b, positioned, respectively, within the first through-opening 9a and the second through-opening 9b, so as to be completely enclosed and contained within the overall dimensions of the driving mass 3 in the plane of the sensor xy. The sensing masses 16a, 16b have a generally rectangular shape matching the shape of the respective through-opening 9a, 9b, and are formed by a first rectangular portion 17, which is wider, and by a second rectangular portion 18, which is narrower (along the first axis x), connected by a connecting portion 19, which is shorter (in a direction parallel to the second axis y) than the first and second rectangular portions. Each sensing mass 16a, 16b has a centroid G located within the corresponding first rectangular portion 17, and is supported by a pair of elastic supporting elements 20. The elastic supporting elements 20 are connected to the connecting portion 19, and extend towards the driving mass 3, in a direction parallel to the second axis y. In other words, the elastic supporting elements 20 extend within recesses 21 provided at opposite sides of the sensing masses 16a, 16b. The elastic supporting elements 20 extend at a distance from the centroid G of the respective sensing mass 16a, 16b, and form torsional springs that are rigid for the rotary motion of the driving mass 3, and also enable rotation of the sensing masses about an axis of rotation parallel to the second axis y and lying in the plane of the sensor xy (and, consequently, their movement outside the plane of the sensor xy).

In addition, the microelectromechanical sensor 1 comprises a second pair of acceleration sensors with axis parallel to the orthogonal axis z, and in particular a second pair of sensing masses 16c, 16d housed within the through-openings 9c, 9d, substantially matching their shape, and completely enclosed and contained within the driving mass 3. The sensing masses 16c, 16d are arranged as a result of a 90° rotation of the sensing masses 16a, 16b, and consequently the corresponding elastic supporting elements 20 extend parallel to the first axis x and enable rotation of the respective sensing masses about an axis of rotation parallel to the first axis x.

A pair of first and second detection electrodes 22, 23 is arranged underneath the first and second rectangular portions 17, 18 of each one of the sensing masses 16a-16d; for example the detection electrodes 22, 23 are constituted by regions of polycrystalline silicon formed on the substrate 2, having equal dimensions, substantially corresponding to those of the second rectangular portion 18. The first and second detection electrodes 22, 23 are separated, respectively from the first and second rectangular portions 17, 18, by an air gap, and are connected to a read circuit. The first and second detection electrodes 22, 23 hence form, together with the first and second rectangular portions 17, 18 respective detection capacitors.

In use, the microelectromechanical sensor 1 is able to operate as a biaxial gyroscope, designed to detect an angular velocity $\vec{\Omega}_x$ (in FIG. 1 assumed as being counterclockwise), about the first axis x, and an angular velocity $\vec{\Omega}_y$ about the second axis y.

On the hypothesis of small displacements of the sensing masses 16a-16d and of small rotations of the driving mass 3, the rotary movement of the driving mass 3 and of the sensing masses 16a-16d about the drive axis can be represented by a driving-velocity vector $\vec{v}_a$, linear and tangential to the circumference that describes the driving trajectory.

In particular, the rotary motion about the first axis x at the angular velocity $\vec{\Omega}_x$ determines a force acting on the entire structure, known as Coriolis force ($\vec{F}_c$). In particular, the Coriolis force $\vec{F}_c$ is proportional to the vector product between the angular velocity $\vec{\Omega}_x$ and the driving velocity $\vec{v}_a$, and is hence directed along the orthogonal axis z, is zero in the points where the driving velocity $\vec{v}_a$ is parallel to the first axis x, and, in the points where it does not go to zero, it is directly proportional to the driving velocity $\vec{v}_a$, and consequently it increases with the distance from the center O. Over the entire structure, considered as a single rigid body, it is hence possible to identify a distribution of Coriolis forces that vary as the distance from the center O varies. The resultants of the Coriolis forces $\vec{F}_c$ acting on the sensing masses 16a, 16b at the corresponding centroid G, cause rotation of the sensing masses, which move out of the plane of the sensor xy, about respective axes parallel to the second axis y and passing through the first elastic supporting elements 20. This movement is allowed by the torsion of the first elastic supporting elements 20. Instead, the configuration of the elastic anchorage elements 8 is such as to inhibit, to a good approximation, movement of the driving mass 3 out of the plane of the sensor xy, thus allowing decoupling of the motion of detection of the sensing masses from the driving motion. The displacement of the sensing masses 16a, 16b out of the plane of the sensor xy causes a differential capacitive variation of the detection capacitors, the value of which is proportional to the angular velocity $\vec{\Omega}_x$, which can hence be determined in a per-se known manner via a purposely provided read circuit. In particular, since the reading scheme is differential, the presence of a pair of sensing masses enables automatic rejection of spurious linear accelerations along the orthogonal axis z. These accelerations, in fact, cause a variation in the same direction of the detection capacitors, which is cancelled by the differential reading (on the contrary, the same structure can be operated as an accelerometer detecting accelerations along the orthogonal axis z, by modifying the electrical connections between the sensing masses and electrodes). The presence of the central anchorage 7 also enables rejection of spurious linear accelerations along the axes x and y, given that the arrangement of elastic anchorage elements 8 is extremely rigid in these directions, and does not enable displacement of the sensing masses. Furthermore, the described structure is able to mechanically reject spurious angular acceleration about the orthogonal axis z, since the frequency response of the sensor can be modeled as a very selective filter.

In an altogether similar manner, the microelectromechanical sensor 1 is able to detect an angular velocity $\vec{\Omega}_y$ about the second axis y. The rotary motion about the second axis y causes a Coriolis force, once again directed along the orthogonal axis z, which causes rotation of the sensing masses 16c, 16d about the axis of rotation parallel to the first axis x, and consequent opposite unbalancing of the corresponding detection capacitors.

The rotation about the first axis x is not sensed by the second pair of sensing masses 16c, 16d, in so far as the resultant Coriolis force $\vec{F}_c$ is zero (on account of the fact that the vector product between the angular velocity $\vec{\Omega}_x$ and the corresponding driving velocity $\vec{v}_a$ is, to a first approximation, zero). Likewise, the rotation about the second axis y is not sensed for similar reasons by the first pair of sensing masses 16a, 16b, and consequently the two axes of detection are not affected and are substantially decoupled from one another.

Although advantageous compared to traditional gyroscope structures, the described microelectromechanical sensor is not optimized with respect to its sensitivity to external stresses, in particular due to the size of the sensing masses, which is limited by the overall dimension of the driving mass.

BRIEF SUMMARY

One embodiment of the present invention provides an integrated microelectromechanical structure that has an improved sensitivity to external stresses.

According to one embodiment of the present invention, an integrated microelectromechanical structure is consequently provided as defined in the present disclosure.

BRIEF DESCRIPTION OF THE SEVERAL VIEWS OF THE DRAWINGS

For a better understanding of the present invention, preferred embodiments thereof are now described purely by way of non-limiting examples and with reference to the attached drawings, wherein.

DETAILED DESCRIPTION

According to one embodiment of the present invention, a microelectromechanical sensor is provided, wherein the geometrical shape of the sensing masses is such as to improve the overall sensitivity of the sensor.

Figure 2:
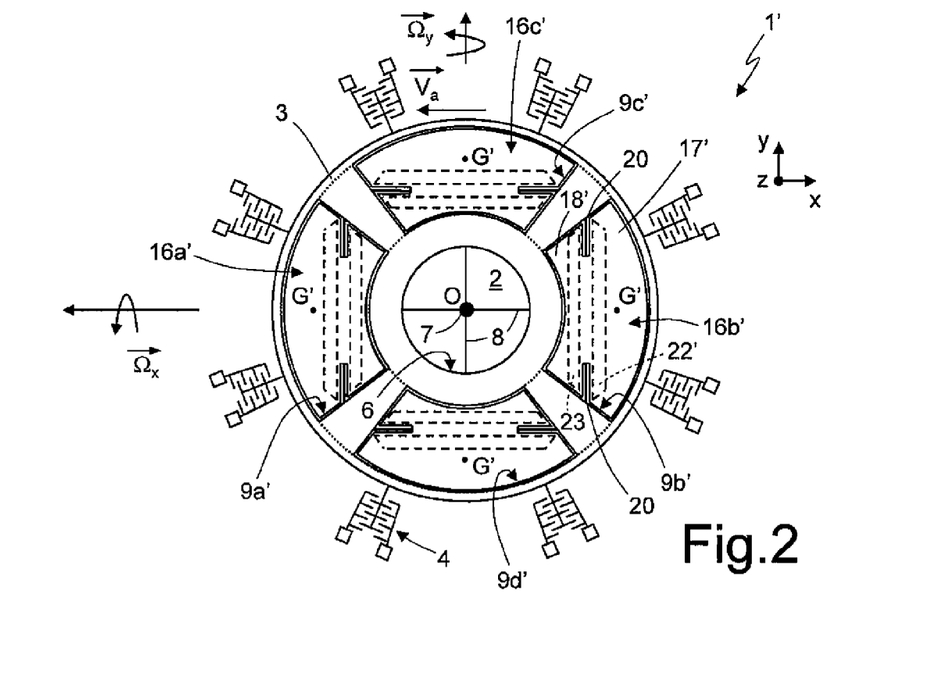
FIG. 2 is a schematic top plan view of a microelectromechanical structure according to one embodiment of the present invention

As shown in FIG. 2 (and in the enlarged view of FIG. 3), wherein same reference numerals are used to refer to the same elements shown in FIG. 1, the microelectromechanical sensor, here denoted with 1', differs from the sensor described with reference to FIG. 1 for a different shape of the through-openings made in the driving mass 3, here denoted with 9a'-9d', and of the corresponding sensing masses, here denoted with 16a'-16d'.

In detail, each of the through-openings 9a'-9d' has in the plane of the sensor xy the shape of a radial annulus sector whose inner radius $R_i$ can be as small as the inner radius of the driving mass 3 and outer radius $R_e$ can be as large as the outer radius of the same driving mass 3. This radial annulus sector has arc-shaped inner and outer sides, and radially extending lateral sides. In the exemplary embodiment shown in FIG. 2, the four through-openings 9a'-9d' are equally angularly spaced apart, the through-openings 9a'-9b' of the first pair being symmetric with respect to the second axis y, and the through-openings 9c'-9d' of the second pair being symmetric with respect to the first axis x.

Each of the sensing masses 16a'-16d' has a shape corresponding to, and matching, that of the respective through-opening 9a'-9d', thus having, in plan view, the overall shape of a radial annulus sector, and a radial geometry. In detail, each sensing mass 16a'-16d' is divided by the corresponding elastic supporting elements 20 into a first portion 17', a second portion 18' and the connecting portion 19 (the latter interposed between, and connected to, the elastic supporting elements 20). The first portion 17' is wider than the second portion 18' along the first and second axis x, y, so that the centroid G' of the sensing mass is located therein, and has an arc-shaped concave outer side and radially extending lateral sides; the second portion 18' has an arc-shaped convex outer side and radially extending lateral sides, aligned along the lateral sides of the first portion 17'. The elastic supporting elements 20, extending at a distance from the centroid G' of the respective sensing mass 16a'-16d', form torsional springs that are rigid for the driving rotary motion of the driving mass 3, and also enable rotation of the sensing masses outside the plane of the sensor xy (as previously described).

The first and second detection electrodes 22', 23' are still arranged underneath the first and second portions 17', 18' of each one of the sensing masses 16a'-16d'; in the embodiment of FIG. 2, the detection electrodes 22', 23' have a trapezoidal shape in the plane of the sensor xy and are symmetric with respect to the axis defined by the elastic supporting elements 20.

Operation of the microelectromechanical sensor 1' does not differ from the one previously discussed with reference to the structure of FIG. 1, so that an angular velocity $\vec{\Omega}_x$ about the first axis x or an angular velocity $\vec{\Omega}_y$ about the second axis y are sensed by the sensor as a function of the displacement of the corresponding pair of sensing masses 16a'-16b' or 16c'-16d' out of the plane of the sensor xy (caused by the originated Coriolis force) and the associated capacitance variation of the detection capacitors.

However, the Applicant has discovered that the previously described non-rectangular shape of the sensing masses 16a'-16d' allows the microelectromechanical sensor 1' to achieve an improved sensitivity to external stresses (in particular to the angular velocities $\vec{\Omega}_x$, $\vec{\Omega}_y$) without causing a variation of the structure resonance frequency. In particular, the solution herein described allows:

with same overall dimensions of the driving mass 3 (and of the whole microelectromechanical sensor 1'), to achieve sensing masses 16a'-16d' with a greater size, which, if suitably chosen, allows to achieve a maximum sensitivity that is greater than a corresponding maximum sensitivity in a traditional structure;

in the particular case wherein a capacitive reading is implemented, with a same area for the detection electrodes, to achieve a greater sensitivity for the sensor (compared to a traditional case wherein all the sensing masses have a rectangular shape).

In detail, in FIG. 3 the sensing mass 16b' (in the following "radial sensing mass") is compared to a traditional rectangular sensing mass 16b (in the following "rectangular sensing mass"). Both sensing masses are symmetric with respect to the first axis x and are inscribed in the same annulus having inner radius $R_i$ and outer radius $R_e$, so that the overall size of the sensor is the same in both cases; the position d of the elastic supporting elements 20 is also the same (the distance of the axis defined by the elastic supporting elements 20 from the center O being equal to d+$R_i$).

Figure 3:
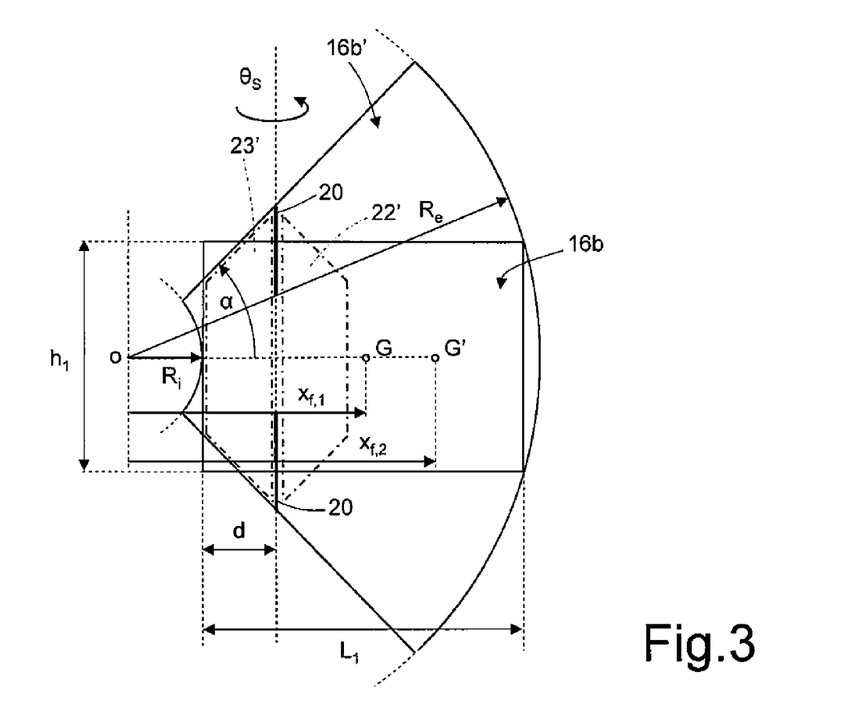
FIG. 3 shows an enlarged portion of the microelectromechanical structure of FIG. 2, showing a sensing mass.

In order to prove the advantage in terms of sensitivity of the radial sensing mass, a comparison is made using a same area of the detection capacitors (detection electrodes 22', 23' are shown in dotted line in FIG. 3). With geometrical considerations, it is easy to see that the angle α, defining the half-extension of the radial sensing mass, that allows to achieve this desired same area is:

$$\tan(\alpha) = \frac{h_1}{2R_i + d}$$

where $h_1$ is the height of the rectangular sensing mass.

The length $L_1$ of the rectangular sensing mass may be also determined with geometrical considerations, by the expression:

$$L_1 = \sqrt{R_e^2 - \left(\frac{h_1}{2}\right)^2} - R_i.$$

Noting that the Coriolis force acting on each point of the sensing mass is distributed like the tangential driving velocity, i.e. proportionally to the distance from the center O, it is possible to show that the distance $x_{f,1}$ between the center O and the centroid G of the rectangular sensing mass (i.e. the application point of the Coriolis force acting on the same rectangular sensing mass) is given by:

$$x_{f,1} = \frac{2}{3} \cdot \frac{(R_i + L_1)^3 - R_i^3}{(R_i + L_1)^2 - R_i^2}$$

while the distance $x_{f,2}$ between the center O and the centroid G' of the radial sensing mass is given by:

$$x_{f,2} = \frac{3}{8} \cdot \frac{R_e^4 - R_i^4}{R_e^3 - R_i^3} \cdot \left(\cos(\alpha) + \frac{\alpha}{\sin(\alpha)}\right).$$

Figure 4:
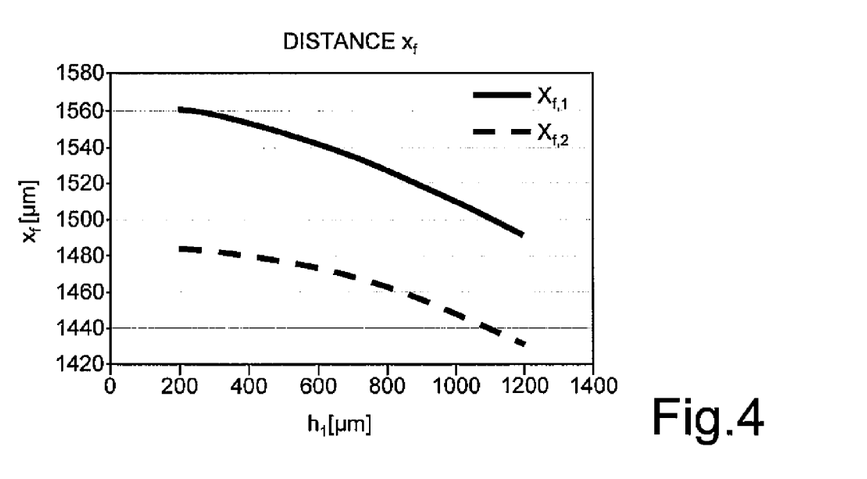
FIGS. 4 and 5 show plots relating to geometrical quantities related to the sensing mass of FIG. 3.

It is thus possible to show that the centroid G of the rectangular sensing mass is always nearer to the elastic supporting elements 20 than the centroid G' of the radial sensing mass (in other words, $x_{f,1}$ is always smaller than $x_{f,2}$). In particular, FIG. 4 shows the plot of the distances $x_{f,1}$ and $x_{f,2}$ as a function of the height $h_1$ of the rectangular sensing mass, considering $R_i$=800 μm, $R_e$=2000 μm and d=400 μm. From the plots it is clear that the radial sensing mass has a centroid G' that is positioned at a distance farther away from the elastic supporting elements 20 (and the corresponding rotation axis) than the centroid G of any rectangular mass, inscribable within a same sector of the driving mass 3 and supported by elastic supporting elements extending along the same rotation axis.

Accordingly, the radial sensing mass experiences a torque that is greater than the one experienced by the rectangular sensing mass and thus undergoes a greater rotational movement outside of the pane of the sensor xy, allowing to achieve a higher sensitivity in the detection of the external stresses.

In greater detail, the torque $M_t$ experienced by the sensing masses is given by the following general expression:

$$M_t = (x_f - R_i - d) \cdot F_c = (x_f - R_i - d) \cdot 2 \cdot m \cdot \vec{\Omega} \times \vec{v}(x_f)$$

wherein m is the mass of the sensing mass, $\vec{\Omega}$ is the angular velocity that is to be detected (the angular velocity $\vec{\Omega}_x$ or $\vec{\Omega}_y$) and $\vec{v}$ is the linear driving velocity at the application point of the Coriolis force $F_c$ with respect to an inertial reference system fixed to the substrate 2 of the sensor.

It is clear from the above expression that a greater distance between the application point of the Coriolis force $F_c$ and the axis of rotation (defined by the elastic supporting elements 20) contributes to the increase of the torque in two ways: first, it increases the lever arm of the Coriolis force $F_c$; and second, it increases the same Coriolis force $F_c$ by increasing the driving velocity $\vec{v}$, which increases linearly with the distance from the center O.

The rotation $\theta_s$ of the sensing mass resulting from the application of the Coriolis force $F_c$ is a function of the torque $M_t$ and of the stiffness k of the elastic supporting elements 20, according to the following expression:

$$\theta_s = \frac{M_t}{k} = \frac{(x_f - R_i - d) \cdot F_c}{k}.$$

Considering the expressions of the Coriolis force $F_c$ in both cases and considering the same design parameters (e.g. in terms of the natural frequency and mass density of the sensing mass) and the same driving velocity $\vec{v}$, the ratio between the rotation $\theta_{s,1}$ of the rectangular sensing mass and the rotation $\theta_{s,2}$ of the radial sensing mass can be expressed as:

$$\frac{\theta_{s,2}}{\theta_{s,1}} = \frac{4}{3} \cdot \frac{(x_{f,2} - R_i - d)}{(x_{f,1} - R_i - d)} \cdot \frac{\sin(\alpha)}{\alpha} \cdot \frac{L_1 \cdot (R_e^2 + R_e \cdot R_i + R_i^2)}{(R_e + R_i)\left(R_e^2 - R_i^2 - \frac{h_1^2}{4}\right)}.$$

Figure 5:
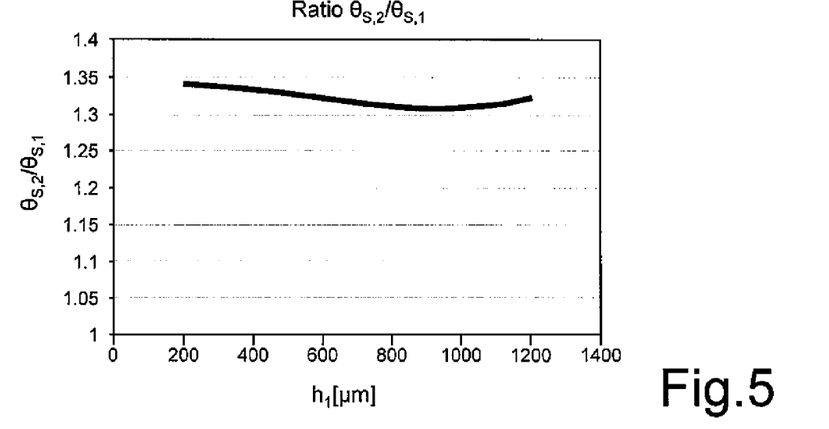

FIG. 5 shows the plot of the above ratio as a function of the height $h_1$ of the rectangular sensing mass, considering the same numerical values previously discussed for FIG. 4. Since the above ratio is always greater than one, it is evident that, considering a same external stress at input of the sensor (angular velocity), the output from the sensor (rotational movement outside the sensor plane xy) in the case of a radial sensing mass is always greater than the corresponding output in the case of a rectangular sensing mass.

A further embodiment of the present invention envisages the provision of further anchorages and elastic anchorage elements connected to the driving mass 3 in order to improve the stiffness of the same driving mass 3 outside the plane of the sensor xy.

Figure 6:
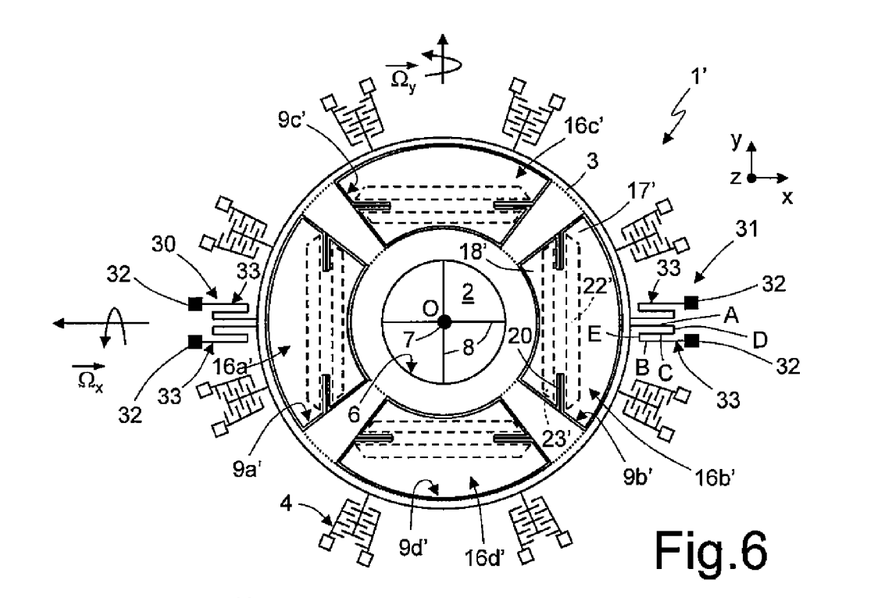
FIG. 6 shows a further embodiment of a microelectromechanical structure.

As shown in FIG. 6 wherein same reference numerals refer to same elements as those in FIG. 2, the microelectromechanical sensor 1' further comprises a first and a second external anchorage arrangements 30, 31, coupled to the driving mass 3 and the substrate 2.

In detail, the first and second external anchorage arrangements 30, 31 are positioned externally of the driving mass 3, and are coupled to opposite sides of the same driving mass 3, with respect to the empty space 6 and center O; in the exemplary embodiment shown in FIG. 6, the first and second external anchorage arrangements 30, 31 are aligned along the first axis x.

Each one of the first and second external anchorage arrangements 30, 31 includes a pair of external anchorages 32 (coupled to the substrate 2) and a pair of external elastic anchorage elements 33, coupling a respective external anchorage 32 to the driving mass 3. In the exemplary embodiment of FIG. 3, the external anchorages 32 and external elastic anchorage elements 33 of each pair are arranged on opposite sides of, and symmetrically with respect to, the first axis x.

Each one of the external elastic anchorage elements 33 comprises a folded spring, generically extending along the first axis x and having the shape of a "S-shaped" folded beam. In greater detail, each folded spring includes: a first arm A, extending along the first axis x and connected to the respective outer side of the driving mass 3; a second arm B extending along the first axis x, parallel to the first arm A, and connected to a respective external anchorage 32; an intermediate arm C, also extending along the first axis x, and interposed between the first and second arms A, B in the second direction y; and a first and a second connecting portions D, E, extending along the second axis y and connecting (at a 90° angle) a respective end of the intermediate arm to the first arm A and to the second arm B, respectively.

Operation of the microelectromechanical sensor 1' does not differ from the one previously discussed with reference to FIG. 2, so that an angular velocity $\vec{\Omega}_x$ about the first axis x is sensed by the sensor as a function of the displacement of the first pair of sensing masses 16a', 16b' out of the plane of the sensor xy (caused by the Coriolis force $F_c$) and the associated capacitance variation of the detection capacitors. Analogously, an angular velocity $\vec{\Omega}_y$ about the second axis y is sensed by the sensor as a function of the displacement of the second pair of sensing masses 16c', 16d' out of the plane of the sensor xy.

However, the presence of the additional first and second external anchorage arrangements 30, 31 improves the overall stiffness of the driving mass 3 and allows to achieve an improved decoupling of the driving and sensing modes, particularly avoiding undesired movements of the driving mass 3 outside of the plane of the sensor xy. In other words, when the Coriolis force $F_c$ acts on the structure, only the sensing masses 16a'-16d' undergo a rotation outside the plane of the sensor xy, while the movement of the driving mass 3 remains substantially unaltered (and in the plane of the sensor xy), so that the sensitivity of the sensor is not affected. Also, it has been proven that undesired vibration modes of the structure are sufficiently removed that they do not interfere with the correct operation of the sensor.

Figure 7:
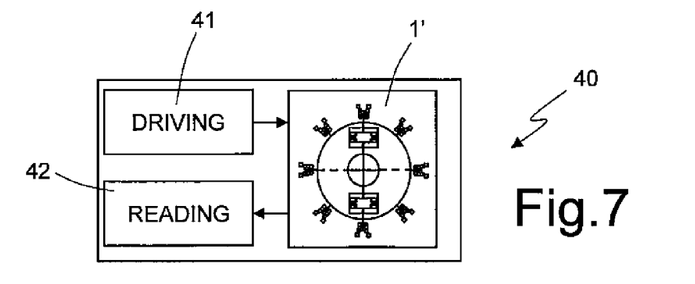
FIG. 7 shows a block diagram of a sensor device provided with the microelectromechanical structure according to a further embodiment of the invention.

FIG. 7 illustrates a sensor device 40 according to a further embodiment and comprising: the microelectromechanical sensor 1'; a driving circuit 41, connected to the driving assembly 4 for imparting the rotary driving motion on the driving mass 3; and a read circuit 42, connected to the detection electrodes 22', 23' for detecting the displacements of the sensing masses 16a'-16d'. The read circuit 42 is also configured to switch a mode of operation of the microelectromechanical sensor 1' between a gyroscope mode and an accelerometer mode, by simply modifying the electrical connections between the sensing masses and the electrodes.

The advantages of the microelectromechanical sensor are clear from the foregoing description.

Indeed, the proposed geometrical shape of the sensing masses allows to achieve a sensible increase in the sensitivity of the sensor, considering a same overall size of the sensor and a same natural frequency thereof, thanks to a more efficient use of the available detection area and a more efficient use of the Coriolis force $F_c$ acting on the sensing masses. In particular, a suitable sizing of the radial sensing masses allows to fully exploit the available space (within the overall dimensions of the driving mass), thus achieving an even further increase of the sensitivity of the sensor.

Moreover, the use of additional external anchorage elements coupled to the driving mass allows to achieve an improved decoupling between the driving and sensing modes of operation.

The microelectromechanical sensor has compact dimensions, given the presence of a single driving mass that encloses in its overall dimensions the sensing masses. The rotary motion of the driving mass enables two components of driving velocity, orthogonal to one another in the plane of the sensor, to be automatically obtained, and hence effective implementation of a biaxial detection.

Finally, it is clear that modifications and variations can be made to what is described and illustrated herein, without thereby departing from the scope of the present invention.

In particular, a different geometry could be envisaged for the sensing masses, different from the radial one but still allowing an improved exploitation of the area available for detection (for example, a substantially trapezoidal geometry could be envisaged); in particular, any geometry can be envisaged having a centroid positioned at a distance farther away from the elastic supporting elements (and the corresponding rotation axis) than the centroid G of any rectangular mass inscribable within a same sector of the driving mass 3 and supported by respective elastic supporting elements extending along the same rotation axis. In analogous manner, also the detection electrodes may have a different shape, corresponding to that of the sensing mass; clearly, if a differential detection is to be implemented, the two detection electrodes should have a same shape.

In particular, it is clear that it is possible to switch the mode of operation of the microelectromechanical structure between a gyroscope mode and an accelerometer mode by simply modifying the connections between the electrodes of the detection capacitors (an operation that can be carried out by a purposely provided read circuit); also, a uniaxial sensor may be equally realized, by providing a single pair of radial sensing masses within the driving mass.

The driving mass can have a shape different from the circular one, for example any closed polygonal shape. Furthermore, even though this may not be advantageous, said shape may not have a perfect radial symmetry (or in general any other type of symmetry).

In a per-se known manner, the displacement of the sensing masses can be detected with a different technique other than the capacitive one, for example, by detecting a magnetic force.

Furthermore, the torsional moment for causing the driving mass to oscillate with rotary motion can be generated in a different manner, for example by means of parallel-plate electrodes, or else magnetic actuation.

The various embodiments described above can be combined to provide further embodiments. All of the above U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated microelectromechanical structure, comprising:
    a driving mass designed to be moved with a rotary motion about an axis of rotation;
    an anchorage arranged along said axis of rotation;
    elastic anchorage elements anchoring said driving mass to said anchorage;
    a first opening provided within said driving mass;
    a first sensing mass arranged inside said first opening; and
    elastic supporting elements connecting the first sensing mass to said driving mass such that the first sensing mass performs a detection movement in the presence of a first external stress, said elastic supporting elements and said elastic anchorage elements being so configured that said first sensing mass is fixed to said driving mass in said rotary motion, and is substantially decoupled from said driving mass in said detection movement;
    wherein said elastic supporting elements define a rotation axis for said sensing mass during said detection movement; and wherein said sensing mass has a shape so configured to have a centroid that is positioned at a distance farther away from said rotation axis than a centroid of any rectangular-shaped sensing mass inscribable in said driving mass and rotatable about said rotation axis.

2. The structure according to claim 1, wherein said sensing mass has, in plan view, a non-rectangular shape and an arc-shaped outer side.

3. The structure according to claim 1, wherein said sensing mass has a radial geometry and, in plan view, the overall shape of a radial annulus sector.

4. The structure according to claim 1, wherein said first opening has a shape substantially matching the shape of said sensing mass.

5. The structure according to claim 1, wherein said elastic supporting elements define in said sensing mass a first portion and a second portion having a different size than the first portion so that the centroid of said sensing mass is located in said first portion at a distance from said elastic supporting elements; said first portion having an arc-shaped concave outer side and radially extending lateral sides, and said second portion having an arc-shaped convex outer side and radially extending lateral sides, aligned along the lateral sides of said first portion.

6. The structure according to claim 1, wherein said driving mass has the shape of an annulus extending substantially in a plane; said axis of rotation being perpendicular to said plane, and said anchorage being arranged substantially at a center of said driving mass in a central aperture defined by said annulus.

7. The structure according to claim 1, wherein said external stress is a Coriolis force acting in a direction perpendicular to a plane in which said driving mass extends, and said detection movement is a rotation outside said plane.

8. The structure according to claim 1, wherein said driving mass extends substantially in a plane and the structure further comprises:
    a second sensing mass, which is aligned with said first sensing mass along a first axis of detection lying in said plane and is arranged in a second opening provided within said driving mass, said first and second sensing masses being enclosed in overall dimensions of said driving mass in said plane; and
    detection means associated with each of said first and second sensing masses for detecting said detection movement, said detection movement being a rotational movement about an axis lying in said plane and perpendicular to said first axis of detection.

9. The structure according to claim 8, wherein said detection means are configured to implement, in given operating conditions, a differential detection scheme.

10. The structure according to claim 8, wherein said detection means include a first detection electrode and a second detection electrode, which are set facing a respective one of said first and second sensing masses and each have a trapezoidal shape.

11. The structure according to claim 1, further comprising:
    a second sensing mass forming with said first sensing mass a first pair of sensing masses, aligned along a first axis of detection lying in a plane on opposite sides with respect to said anchorage; and
    a second pair of sensing masses aligned along a second axis of detection lying in said plane and orthogonal to said first axis of detection, on opposite sides of said anchorage.

12. The structure according to claim 1, wherein said driving mass has in a plane a circular geometry, having a first axis of symmetry and a second axis of symmetry with an empty space at a center of the driving mass; wherein the center of the driving mass is in a position corresponding to said anchorage, and said elastic anchorage elements extend within said empty space.

13. The structure according to claim 1, further comprising:
    a first external anchorage positioned externally of said driving mass and coupled to a first side of the driving mass by a first external elastic anchorage element; and
    a second external anchorage positioned externally of said driving mass and coupled to a second side of the driving mass by a second external elastic anchorage element, the second side being opposite to the first side;
    wherein said elastic supporting elements and said first, second and third elastic anchorage elements are so configured that said first sensing mass is fixed to said driving mass in said rotary motion, and is decoupled from said driving mass in said detection movement.

14. The structure according to claim 13, wherein said driving mass has an annular shape extending substantially in a plane, said axis of rotation being perpendicular to said plane, and said anchorage being arranged substantially at a center of said driving mass in a central aperture; and wherein said second side is opposite to said first side with respect to said central aperture.

15. The structure according to claim 14, wherein said first and second external anchorages are diametrically opposite with respect to said central aperture.

16. The structure according to claim 13, wherein said first and second external elastic anchorage elements comprise respective folded springs.

17. A microelectromechanical sensor device, comprising:
    a driving mass designed to be moved with a rotary motion about an axis of rotation;

an anchorage arranged along said axis of rotation;
elastic anchorage elements anchoring said driving mass to said anchorage;
a first opening provided within said driving mass;
a first sensing mass arranged inside said first opening; and
elastic supporting elements connecting the first sensing mass to said driving mass such that the first sensing mass performs a detection movement in the presence of a first external stress, said elastic supporting elements and said elastic anchorage elements being so configured that said first sensing mass is fixed to said driving mass in said rotary motion, and is substantially decoupled from said driving mass in said detection movement;
wherein said sensing mass has, in plan view, a non-rectangular shape.

18. The sensor device according to claim 17, further comprising a read stage configured to switch a mode of operation of said microelectromechanical structure between a gyroscope mode and an accelerometer mode.

19. The sensor device according to claim 18, wherein said sensing mass has an arc-shaped outer side.

20. The sensor device according to claim 18, wherein said sensing mass has a radial geometry and, in plan view, the overall shape of a radial annulus sector.

21. The sensor device according to claim 18, wherein said driving mass extends substantially in a plane and the sensor device further comprises:
a second sensing mass, which is aligned with said first sensing mass along a first axis of detection lying in said plane and is arranged in a second opening provided within said driving mass, said first and second sensing masses being enclosed in overall dimensions of said driving mass in said plane; and
detection means associated with each of said first and second sensing masses for detecting said detection movement, said detection movement being a rotational movement about an axis lying in said plane and perpendicular to said first axis of detection.

22. A microelectromechanical gyroscope comprising:
an anchorage;
elastic anchorage elements;
a driving mass operable to move in a rotary motion about an axis of rotation, the driving mass being anchored via the elastic anchorage elements to the anchorage, the anchorage being arranged along the axis of rotation and the driving mass substantially extending in a plane perpendicular to the axis of rotation;
a first opening disposed within the driving mass;
elastic supporting elements;
a first sensing mass disposed within the first opening and coupled to the driving mass via the elastic supporting elements to allow for a detection movement in response to an external stress, the elastic supporting elements and the elastic anchorage elements being configured to fix the sensing mass to the driving mass, and wherein the elastic anchorage elements are substantially decoupled from the driving mass during the first detection movement, and the first detection movement is a rotational movement about a rotation axis lying in the plane;
wherein said sensing mass has a radial geometry and, in plan view, the overall shape of a radial annulus sector.

23. The sensor device according to claim 18, further comprising:
a second sensing mass, which is aligned with said first sensing mass along a first axis of detection lying in said plane and is arranged in a second opening provided within said driving mass, said first and second sensing masses being enclosed in overall dimensions of said driving mass in said plane; and
detection means associated with each of said first and second sensing masses for detecting said detection movement, said detection movement being a rotational movement about an axis lying in said plane and perpendicular to said first axis of detection.

* * * * *